Patented June 20, 1950

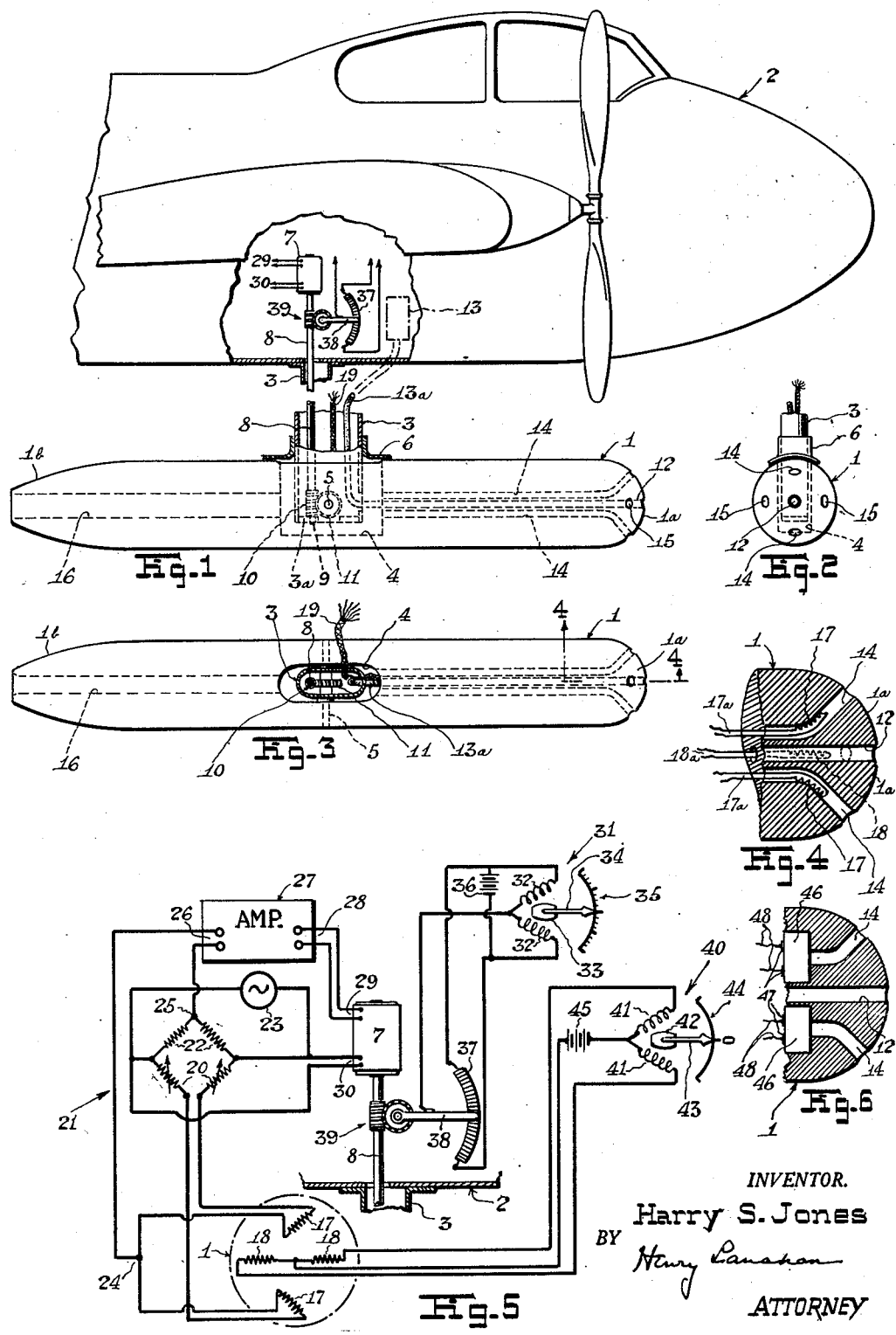

2,512,278

UNITED STATES PATENT OFFICE 2,512,278

AIR-FLOW INDICATOR

Harry S. Jones, East Orange, N. J., assignor to Thomas A. Edison, Incorporated, West Orange, N. J., a corporation of New Jersey Application April 11, 1945, Serial No. 587,679

5 Claims. (Cl. 73—180)

My invention relates to air-flow indicating apparatus for airplanes and especially to improved apparatus for measuring the direction of the air stream relative to the airplane.

My invention contemplates a single air-indicating head for measuring the angle of attack (pitch or yaw) of an airplane relative to the direction of the air stream, as well as the air speed, and it is especially an object of my invention to provide a novel apparatus and system which will measure the angle of attack with a high degree of accuracy.

Another object is to provide such apparatus and system which is highly stable and dependable in its operation.

Another object is to provide a system and apparatus for measuring the angle of attack, which is substantially independent in its indications of non-linear influences of the air stream on the air-indicating head.

Features of my invention are to pivotally support the air-indicating head and to provide a control apparatus for the head which maintains it in alignment with the direction of a component of the air stream under measurement. In so doing, as will be understood, I am able to measure more accurately the angle of the airplane with respect to that component of the air stream. In the present illustrative embodiment of my invention, the head is pivotally supported for angular movement in the vertical plane of the airplane—that is, in a plane at right angles to the wings—and the head is maintained in alignment with the component of the air stream which is within this vertical plane so that the angle of pitch may be measured with maximum accuracy. Ordinarily, the angle of yaw need not be measured with close accuracy and therefore—and for simplifying the description—the air-indicating head is not herein shown as being maintained in alignment with the component of the air stream which is in the horizontal plane relative to the airplane. However, if desired, my invention may also be employed to measure the angle of yaw with close accuracy, and it is intended that the phrase "angle of attack" in the appended claims covers the horizontal or any other predetermined plane as well as the vertical plane.

It is accordingly another object of my invention to control an air-indicating head so that it will always be substantially aligned with a component of the air stream which is under measurement.

A further object is to provide an improved electrical system for controlling the air-indicating head, and particularly to provide such an improved system operating on the null principle.

These and other objects and features of my invention will more fully appear from the following description and the appended claims.

In the description of my invention reference is had to the accompanying drawings, of which:

Figure 1 is a fractional side elevational view, partly broken away, of an airplane in which my invention is incorporated, the air-indicating head being shown to enlarged scale relative to that of the airplane;

Figure 2 is a front end view of the air-indicating head;

Figure 3 is a top plan view of the air-indicating head;

Figure 4 is a fractional sectional view of the head taken on the line 4—4 of Figure 2;

Figure 5 is a view of circuits and mechanism in accordance with my invention; and Figure 6 is a fractional sectional view illustrating a second embodiment of air-indicating head according to my invention.

The air-indicating head, referred to as 1, is mounted on the airplane in a place where it will be in a part of the air stream which is out of the blast of the propellers and undisturbed by the airplane. For instance, on a two-motored airplane, as indicated in Figure 1, the head may be mounted below the fuselage 2 as onto the lower end portion of a hollow rigid strut 3 which depends below and is rigidly secured to the fuselage. The central portion of the head may, for example, have a recess 4 received by the lower end portion of the strut 3, and a pivot rod 5 may be extended laterally through this central portion of the head and through the strut to secure pivotally the head to the strut for angular movement of the head in the vertical plane of the airplane, the rod being secured to the head and journalled in the side walls of the strut for reasons which will be hereinafter apparent. The joint between the strut and the head may be covered by a flexible protective sheath 6. By way of example, the head is generally cylindrical in shape but is provided with a semispherical forward end or nose portion 1a and with a tapered tail portion 1b. The length of the head may be from 8–12" and the diameter from 1–1½".

The head is adjusted angularly relative to the airplane by means of a reversible motor 7 which is located in the fuselage 2. This motor is coupled to a shaft 8 which extends downwardly through the strut 3 to the lower end thereof, the shaft being journalled at 9 to a bottom end wall 3a of the strut. Secured to the portion of the shaft just above the journal 9 is a worm gear 10 which meshes with a pinion 11 that is secured to the intermediate portion of the rod 5 between the side walls of the strut. Since the pivot rod 5 is secured to the head, as aforementioned, the motor is coupled through to the head; thus, when the motor is turned in one direction and another the head is tilted upwardly and downwardly relative to the airplane.

In order that the head may measure the air speed it is provided with a Pitot tube or central air duct 12—say 1/8" in inside diameter—which extends axially through the head from the nose 1a thereof to the recess 4. This duct is coupled to an indicating instrument 13 in the fuselage by means of flexible tubing 13a which extends upwardly through the strut 3. The instrument 13 may be of any suitable form known in the art and need not be herein described in detail.

The head is also provided with a pair of air ducts 14 spaced vertically with respect to the airplane and located in diametrically opposite positions relative to the central longitudinal axis of the head; additionally, the head has a second similar pair of air ducts 15 which are spaced horizontally with respect to the airplane. Each of these ducts 14 and 15 may have inside diameters of the order of 1/8". These ducts may extend radially inwardly from points on the nose 1a at angular distances of about 45° from the central longitudinal axis, and may be curved rearwardly near the center of the head to extend in parallel relation with the central axis to the recess 4. Beyond the recess 4, these air ducts may merge into one relatively large duct 16—say 3/8" in inside diameter—which extends out through the tail end portion 1b of the head. Upon properly designing the head in accordance with known aerodynamic principles, the air will flow through these ducts, during flight, at rates depending upon the air stream velocity and the direction of the head relative to that of the air stream. For instance, when the head is pointed in the direction of the air stream the velocity of the airflow will be the same through each of the ducts, but when the head is pointed away from the direction of the air stream the airflow velocity will be less in those ducts which are offset from the axis of the head in the direction in which the head is out of alignment with the air stream.

Mounted within the air ducts 14 and 15 are electrically-responsive airflow detecting devices respectively comprising resistors 17 and 18. These are resistors whose resistances vary appreciably with variation in their temperatures, they being for example fine wires of platinum. These resistances have lead wires 17a and 18a which are threaded rearwardly through the air ducts into the recess 4. From this recess the lead wires extend upwardly through the strut 3 into the fuselage as by way of a cable 19.

The resistors 17 are supplied with equal heating current, but their rates of cooling vary according to the velocity of the airflow in the respective ducts 14, and therefore their relative resistances depend upon the direction which the head bears relative to the air stream. It is by this variation in their resistances that the direction of the head is controlled, as is now explained in detail.

The resistors 17 are serially connected with adjusting resistors 20 to form the respective arms of one branch of a Wheatstone bridge 21 as shown in Figure 5. The other branch of this bridge consists of two serially-connected resistances 22. The two branches are connected in parallel and to an A.-C. source 23 of potential having a frequency for example of 400 C. P. S. Across the branch of this bridge—i. e., from junction point 24 between resistors 17 to junction point 25 between resistors 22—is connected the input 26 of an electrical amplifier 27. The output 28 of this amplifier feeds into one set of power input terminals 29 of the reversible motor 7. A second pair of power input terminals 30 on this motor are connected directly across the power source 23. This is a reversible motor of conventional design which will run in one direction when the power supplied to the terminals 29 is in phase with or in phase opposition to that supplied the terminals 30, and will run in the opposite direction when that phase relation is reversed, the motor standing still for instance when the power to one set of the terminals is zero.

In operation, the resistors 17 are heated by current from the potential source 23 but the temperatures of the resistors, and accordingly the values of their resistance, depend upon the velocity of the airflow through the respective ducts 14. If the head is out of alignment with the direction of the component of the air stream which is in the vertical plane of the airplane, one of the resistors 17 is subjected to less cooling than is the other and it has therefore greater resistance. The bridge 21 is then unbalanced in one direction, and as a result a voltage is impressed on the input of the amplifier 27, amplified and fed to the terminals 29 of the motor 7. This power to the motor from the amplifier is in- or out-of-phase (by 180°) with the power supplied directly to the motor from the potential source 23. Thus, the motor turns in a direction dependent upon that in which the head is out of alignment with the air stream. This operation of the motor, upon the coupling of the motor with the head being properly phased, restores the head into alignment with the component of the air stream being measured. When this alignment occurs both resistors 17 are subjected to the same cooling and the bridge is again substantially balanced. As a near-balanced condition occurs, the voltage input to the amplifier falls substantially to zero and the motor comes to standstill. When the head is out of alignment with the air stream in a reverse direction, it is the other of the two resistors 17 which is the cooler. As a result, the bridge is then unbalanced in a reverse direction, the voltage to the amplifier is 180° out-of-phase from what it was before, and the motor is turned in the opposite direction to again restore the head 1 into alignment with the component of the air stream under measurement. Thus the head is maintained always substantially in alignment with the air component under measurement and the bridge is maintained substantially balanced for each indicating position of the head, this being known as a null method of indication.

Since the head is maintained in alignment with the air component under measurement, the relative position of the head to the airplane is an indication of the angle of attack. For indicating this angle there is provided a meter 31 in the airplane. This meter is preferably one of the ratiometer type having, as a preferred structural arrangement, two field coils 32 located at angles to each other about a pivoted permanent magnet 33. Carried with the magnet is a pointer 34 which indicates relative to a scale 35. The field coils are connected in series across a battery 36, and also across a rheostat 37, and the common junction point of the coils is connected to a movable contact arm 38 of this rheostat. This contact arm is coupled to the shaft 8 aforementioned as by a worm gear and pinion generally referred to as 39, so that the arm will be moved according to the angular positioning of the head 1 relative to the airplane. As the contact arm is moved, a smaller shunt resistance is placed across one field coil and a larger shunt resistance across the other to cause the ratio of the currents in the coils to vary and the resultant magnetic field of the coils to shift angularly with respect to the pivot axis of the magnet 33. The magnet takes positions wherein its magnetic axis is aligned with this resultant magnetic field of the coils. Thus, upon properly calibrating the scale 35, the pointer 34 will indicate correctly the angle of attack of the airplane relative to the air stream.

The present method of indicating the angle of attack will be understood to be a highly accurate one because variations in the speed of the airplane as well as variations in wind velocity are ruled out as possible sources of error. For instance, although the air velocity in the air ducts 14 may vary non-linearly with respect to the air-stream velocity, the differential between the air velocities in the ducts may vary non-linearly as the head is moved out of alignment with the air component under measurement, and the cooling effect on the resistors 17 may be non-linear functions of the air velocities in the ducts 14, none of these non-linear effects influence the indications of the system for at each indicating position the resistors 17 are subjected alike to the same cooling irrespective of the speed of the airplane, the wind velocity, etc. Since each stabilized indication of the system is not influenced by these non-linear effects, the operation of the system is very accurate and the calibration of the system is a very simple one, being merely a matter of calibrating the meter 31 to read the angular positioning of the head 1.

As a practical matter, the air-indicating head 1 need not ordinarily be moved angularly in the horizontal plane to measure the angle of yaw for it is generally only necessary for the pilot to know the direction of this angle and not its value quantitatively. Moreover, when the head 1 is retained in the vertical plane of the airplane, it will indicate a zero angle of yaw without error for then the resistors 18 in the horizontally-spaced ducts 15 are subjected to the same cooling irrespective of the speed of the airplane, the same as is obtained in the system above described for measuring the angle of attack. For measuring this angle I preferably employ a second ratiometer 40, as above described, having coils 41 disposed at angles about a pivoted magnet 42, the magnet having a pointer 43 connected thereto which cooperates with a scale 44 having however only a zero-angle graduation. Purely by way of example, each field coil of this ratiometer may be connected serially with one of the resistors 18, and the serial arrangements of coils and resistors may be connected in parallel with each other to form an electrical bridge. This bridge is supplied with current from a battery 45. When the air-indicating head is aligned with the component of the air stream which is in the horizontal plane relative to the airplane, the resistors 18 have the same values of resistance and equal currents flow through the field coils 41. As a result, the pointer reads midway between the coils at zero on the scale. When the head is moved out of alignment with that component of the air stream, the resistors have different values, the bridge is then unbalanced in one direction or another, and the pointer reads to one side or the other of zero to indicate an angle of yaw.

Preferably the resistors 17 and 18 are placed in the curved portions of the air ducts 14 and 15 adjacent the sides of the ducts which are nearer the centers of curvature of these curved portions. Since elements of the weather which enter these ducts tend to be thrown against the farther sides of the curved portions of the ducts, the resistors are protected in great measure from these elements when they are so mounted.

It is to be noted that the angular control exercised over the air-indicating head 1, as hereinabove described, has beneficial results also in connection with the measurement of the air speed. For example, the airplane is normally controlled so that the angle of yaw is zero. Since by the above-described apparatus the head is automatically controlled so that the angle of attack is maintained substantially at zero, it follows that the head is normally substantially aligned with the air stream and that therefore the pressure within the air duct 12 is a accurate indication of the air speed.

It will be understood by those skilled in the art that various forms of electrically-responsive airflow detecting devices may be employed in the head 1 other than that hereinabove described. By way of illustration, I show in Figure 6 an alternative form wherein the ducts 14 terminate respectively in pressure-responsive resistance devices 46. Each of these devices may be basically a form of double-button carbon transmitter which, being well known in the art, need not be herein specifically described; suffice it to say that each device has a resistance chamber the resistance of which is variable in response to varying fluid pressure from the ducts 14 and that this resistance is connected to a pair of terminals 47. Lead wires 48, corresponding to the lead wires 17a above described, serve to connect these pressure-responsive devices to the bridge 21 in the manner above described. When the head is out of alignment with the air stream, the pressures in the ducts 14 are unequal, causing the resistors of the devices 46 to be unequal and the bridge 21 to be unbalanced; in response to this unbalanced condition the head is restored into alignment with the air stream, the same as in the above-described embodiment.

The embodiments herein described are intended to be illustrative and not limitative of my invention, and while they have particular application to aircraft and are described as airflow indicating systems, it will be understood that my invention pertains basically to fluid-flow indicating systems and may have application to other vehicles than aircraft. My invention contemplates not only such other applications thereof, but also such modifications and changes in the embodiments herein described as are obvious to those skilled in the art. The scope of my invention I endeavor to express according to the following claims.

I claim:

1. In apparatus for indicating the angle of attack of an airplane relative to the air stream: the combination of a head on said airplane in the air stream and mounted for relative angular movement in a predetermined plane relative to the airplane; means for angularly moving said head; a pair of impedance-variable devices carried by said head in positions diametrically opposite the longitudinal axis thereof and adapted to respond differently to deviation of the head from alignment with the component of the air stream which is within said predetermined plane; an electrical bridge system including said devices and controlling said moving means for maintaining said head substantially in alignment with said component; and remote indicating means within the airplane and controlled by said moving means for indicating the angle of said head.

2. In apparatus for indicating the angle of attack of an airplane relative to the air stream: the combination of a head on said airplane in the air stream and mounted for relative angular movement in a predetermined plane relative to the airplane; a pair of impedance-variable devices mounted in said head at opposite sides of the longitudinal axis thereof and adapted to respond differently to deviation of the head from alignment with the component of the air stream which is within said predetermined plane; an electrical bridge including said devices and balanced when said head is aligned with said component; and reversible means, controlled by said bridge according to the direction of unbalance of the bridge, for maintaining said head substantially in alignment with said component.

3. In apparatus for indicating the angle of attack of an airplane relative to the air stream: the combination of a head on said airplane in the air stream and mounted for relative angular movement in a predetermined plane relative to the airplane; a pair of temperature-responsive resistors mounted in said head at opposite sides of the longitudinal axis thereof and adapted to respond differently to deviation of the head from alignment with the component of the air stream which is within said predetermined plane; an electrical bridge including said resistors in two arms thereof, said bridge being substantially balanced when the head is aligned with said component and being unbalanced in one direction and another when the head is out of alignment in one direction and another with respect to said component; and reversible means, connected diagonally across said bridge and operated in respective directions according to the direction of unbalance of said bridge, for angularly controlling said head whereby the head is maintained substantially aligned with said component and said bridge is substantially balanced in each stabilized position of the head.

4. In apparatus for indicating the angle of attack of an airplane relative to the air stream: the combination of a head on said airplane in the air stream and mounted for relative angular movement in a predetermined plane relative to the airplane, said head having orifices in the forward end portion thereof which are in said plane at diametrically opposite sides of the longitudinal axis of the head; a reversible motor having direct mechanical coupling with said head for angularly controlling the latter; temperature-responsive resistors in said orifices adapted to respond differently to deviation of the head from alignment with the component of the air stream within said predetermined plane; an electrical bridge including said resistors for controlling said motor to maintain said head substantially in alignment with said component; an angle-of-attack indicator; and means operated by said motor according to the angle of said head relative to the airplane for controlling said indicator.

5. In a fluid-flow indicating apparatus for a vehicle which moves relative to a fluid stream: the combination of a head of generally cylindrical shape movably mounted on said vehicle in the fluid stream and having a rounded nose portion; a pair of fluid-inlet ducts in said head extending inwardly from points on said nose portion which are on substantially diametrically opposite sides of the longitudinal axis of the head; impedance elements mounted in said head and operatively associated with said ducts respectively, said impedance elements being adapted to respond differently to a condition of flow of the fluid stream upon deviation of the head from alignment with the component of the fluid stream which is in the common medial plane of said axis and the forward open ends of said ducts; an electrical bridge including said impedance elements and substantially balanced when said head is aligned with said component; means including said bridge and operated upon unbalance thereof according to the direction of that unbalance for substantially maintaining said head aligned with said component; and means controlled by said head according to the angle thereof to the vehicle for indicating the angle of the vehicle to said component of the fluid stream.

HARRY S. JONES.

REFERENCES CITED

The following references are of record in the file of this patent:

UNITED STATES PATENTS

| Number | Name | Date |
|---|---|---|
| 1,822,184 | Wunsch | Sept. 8, 1931 |
| 1,841,607 | Kollsman | Jan. 19, 1932 |
| 2,237,306 | Hood | Apr. 8, 1941 |
| 2,343,288 | Fink | Mar. 7, 1944 |
| 2,352,955 | Johnson | July 4, 1944 |

FOREIGN PATENTS

| Number | Country | Date |
|---|---|---|
| 78,971 | Austria | Nov. 10, 1919 |